(12) United States Patent
Hashimoto et al.

(10) Patent No.: US 12,454,000 B2
(45) Date of Patent: Oct. 28, 2025

(54) MANUFACTURING METHOD OF BALL SCREW USING ROLLING MACHINE

(71) Applicant: HITACHI ASTEMO, LTD., Hitachinaka (JP)

(72) Inventors: Kinichi Hashimoto, Hitachinaka (JP); Keisuke Kitamura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 287 days.

(21) Appl. No.: 18/272,231

(22) PCT Filed: Dec. 10, 2021

(86) PCT No.: PCT/JP2021/045479
§ 371 (c)(1),
(2) Date: Jul. 13, 2023

(87) PCT Pub. No.: WO2022/158159
PCT Pub. Date: Jul. 28, 2022

(65) Prior Publication Data
US 2024/0139798 A1    May 2, 2024

(30) Foreign Application Priority Data
Jan. 19, 2021  (JP) ................. 2021-006104

(51) Int. Cl.
*B21K 1/56* (2006.01)
*B21K 1/04* (2006.01)

(52) U.S. Cl.
CPC . *B21K 1/56* (2013.01); *B21K 1/04* (2013.01)

(58) Field of Classification Search
CPC ... B21K 1/04; B21K 1/56; B21H 3/02; B21H 3/022; B21H 3/04; F16H 2025/2481; B21D 37/18
(Continued)

(56) References Cited

U.S. PATENT DOCUMENTS

| | | | | |
|---|---|---|---|---|
| 3,774,432 A | * | 11/1973 | Bedker | B21H 3/042 492/1 |
| 4,924,687 A | * | 5/1990 | Francia | B21H 3/042 72/104 |
| 2020/0061686 A1 | | 2/2020 | Murai et al. | |

FOREIGN PATENT DOCUMENTS

| | | |
|---|---|---|
| JP | S5212642 U | 1/1977 |
| JP | S57-193257 A | 11/1982 |

(Continued)

OTHER PUBLICATIONS

CN 105945183A, Zhang et al. Sep. 2016.*
(Continued)

*Primary Examiner* — Edward T Tolan
(74) *Attorney, Agent, or Firm* — FOLEY & LARDNER LLP

(57) ABSTRACT

A rolling machine has a rolling die 4 that forms a male screw by pressing a steering shaft 14 which is an object to be rolled and plastically deforming an outer peripheral surface of the steering shaft 14 while rotating in contact with the outer peripheral surface of the steering shaft 14, a main spindle 3 inserted into a penetration hole 10 of the rolling die 4 and transmitting a rotation force to the rolling die 4, a key groove and a key which restrict a relative rotation between the rolling die 4 and the main spindle 3, a spiral oil groove 16 provided on an inner peripheral surface of the penetration hole 10 or an outer peripheral surface of the main spindle and extending from one end portion 10b side in an axial direction of the penetration hole in an inner axial direction of the penetration hole.

4 Claims, 7 Drawing Sheets

(58) Field of Classification Search
USPC .................................................. 72/104, 108
See application file for complete search history.

(56) References Cited

FOREIGN PATENT DOCUMENTS

| | | |
|---|---|---|
| JP | 2001-001095 A | 1/2001 |
| JP | 2003-062634 A | 3/2003 |
| JP | 2018-176172 A | 11/2018 |

OTHER PUBLICATIONS

CN 107159828A, Zhao et al. Sep. 2017.*
CN 110586819A, Meng et al. Dec. 2019.*
KR 101606116B1, Lee et al. Mar. 2016.*
International Preliminary Report on Patentability and Written Opinion dated Aug. 3, 2023 issued in International Patent Application No. PCT/JP2021/045479, with English translation, 12 pages.
International Search Report dated Feb. 15, 2022 issued in International Patent Application No. PCT/JP2021/045479, with English translation, 5 pages.

\* cited by examiner

MANUFACTURING METHOD OF BALL SCREW USING ROLLING MACHINE

TECHNICAL FIELD

The present invention relates to a rolling machine and a method for manufacturing a ball screw manufactured by this rolling machine.

BACKGROUND ART

As this type of rolling machine, various rolling machines such as a round die rolling machine and a planetary rolling machine have been provided according to type of dies. As one of them, a round die rolling machine described in the following Patent Document 1 is known. This round die rolling machine is a device that processes a male screw (a male thread) and the like by plastically deforming an outer peripheral surface of a cylindrical columnar screw material (blank).

In this round die rolling machine, a pair of thread rolling dies are fitted onto a pair of main spindles respectively, and these thread rolling dies are engaged with and fixed to the main spindles respectively through keys and key grooves. The pair of these main spindles are each configured to synchronously rotate in the same direction by a drive unit formed by a drive motor and a speed reducer. The pair of rolling dies are each driven and rotated in the same direction by the rotation of the respective main spindles, and a male thread is formed on the outer peripheral surface of the blank, then a screw member is formed.

CITATION LIST

PATENT DOCUMENT
Patent Document 1: Japanese Unexamined Patent Application Publication No. 2001-001095 (FIG. 1)

SUMMARY OF THE INVENTION

Technical Problem

In a case of the rolling machine described in Patent Document 1, high processing heat is generated during rotary processing of each rolling die, and this high heat is transferred from each rolling die to each main spindle, then there is a risk that an inner peripheral surface of a penetration hole of each rolling die will adhere to (or stick to) an outer peripheral surface of each main spindle by this high heat.

As a consequence, when replacing each rolling die, it becomes extremely difficult to remove the rolling die, and this removal workability is deteriorated, which in turn leads to decrease in efficiency in rolling work.

The present invention was made in view of the above technical problem of the conventional art. An object of the present invention is therefore to provide a rolling machine that is capable of suppressing an occurrence of the adhesion (the sticking) of the rolling die to the main spindle and facilitating removal work of the rolling die.

Solution to Problem

As one of aspects of the present invention, a rolling machine comprises: a rolling die structured to form a male screw by pressing a shaft-shaped member and plastically deforming an outer peripheral surface of the shaft-shaped member while rotating in contact with the outer peripheral surface of the shaft-shaped member; a main spindle inserted into a penetration hole of the rolling die, which is formed so as to penetrate the rolling die in a direction of a rotation axis of the rolling die, and transmitting a rotation force to the rolling die; a restricting portion restricting a relative rotation of the rolling die with respect to the main spindle; and a linear oil groove provided on an inner peripheral surface of the penetration hole or an outer peripheral surface of the main spindle and extending from an end portion side in an axial direction of the penetration hole in an inner axial direction of the penetration hole.

Effects of Invention

According to the aspect of the present invention, it is possible to suppress the occurrence of the adhesion (the sticking) between the rolling die and the main spindle and improve the workability of removing the rolling die from the main spindle.

BRIEF DESCRIPTION OF THE DRAWINGS

FIG. 4A is a perspective view of the rolling die. FIG. 4B is an enlarged view of a main part of FIG. 4A.

FIGS. 5A and 5B are local sectional views of the two rolling dies which are different in the forming position of the oil groove. FIGS. 5C and 5D are front views of the rolling dies corresponding to FIGS. 5A and 5B.

FIG. 6A is a front view of the rolling die. FIG. 6B is a sectional view taken along a C-C line of FIG. 6A.

FIG. 7A is a front view of the rolling die. FIG. 7B is a sectional view taken along a D-D line of FIG. 7A.

EMBODIMENTS FOR CARRYING OUT THE INVENTION

Embodiments of a rolling machine and a manufacturing method of a ball screw using this rolling machine according to the present invention will be described in detail below with reference to the drawings.

The rolling machine of the embodiments is a round die rolling machine, and an object to be rolled (a shaft-shaped member) is a steering shaft of a ball screw used in an electric power steering device described in, for instance, Japanese Unexamined Patent Application Publications JP2019-189925 and JP2020-026185.

That is, the ball screw has a nut which has a helical female screw groove formed on its inner peripheral surface, a steering shaft, as a shaft-shaped member, to which the nut is assembled and which has a helical male screw groove formed on its outer peripheral surface and facing the female screw groove, and circulation balls disposed between the female screw groove and the male screw groove. The steering shaft is configured to move with respect to the nut in a direction of a rotation axis of the nut by movement of the circulation balls in a ball movement passage which occurs as the nut rotates.

Figure 1:
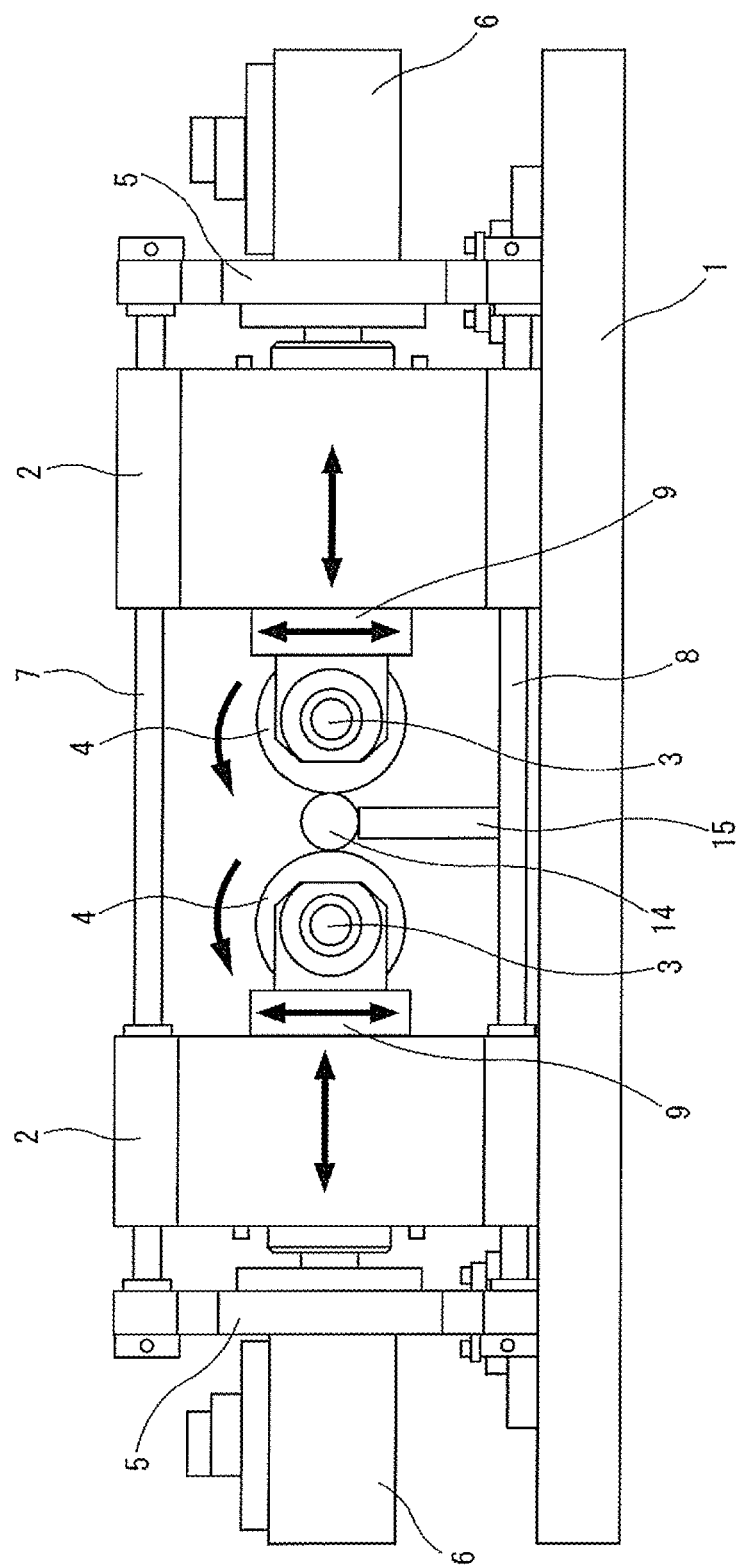
FIG. 1 is an overall block diagram of a round die rolling machine according to embodiments of the present invention.
Figure 2:
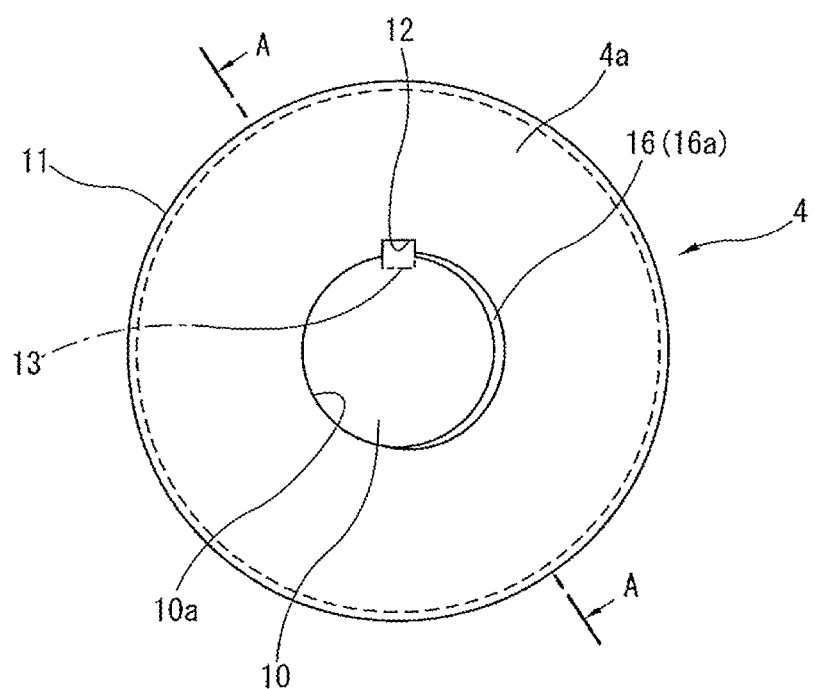
FIG. 2 is a front view of a rolling die according to a first embodiment of the present invention.
Figure 3:
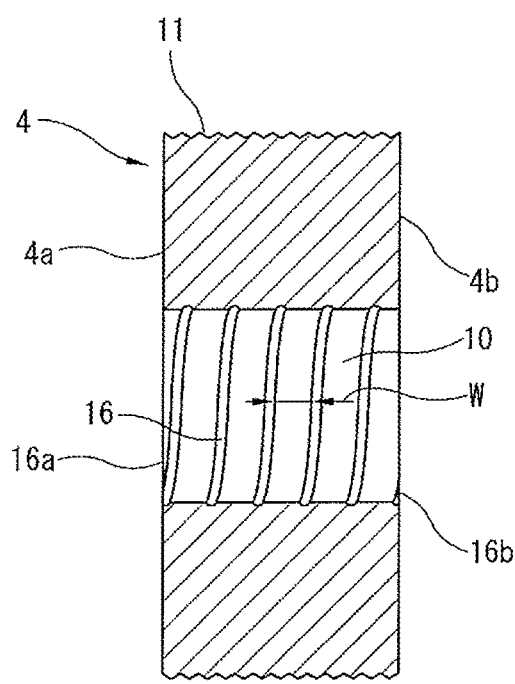
FIG. 3 is a sectional view taken along an A-A line of FIG. 2.
Figure 4A:
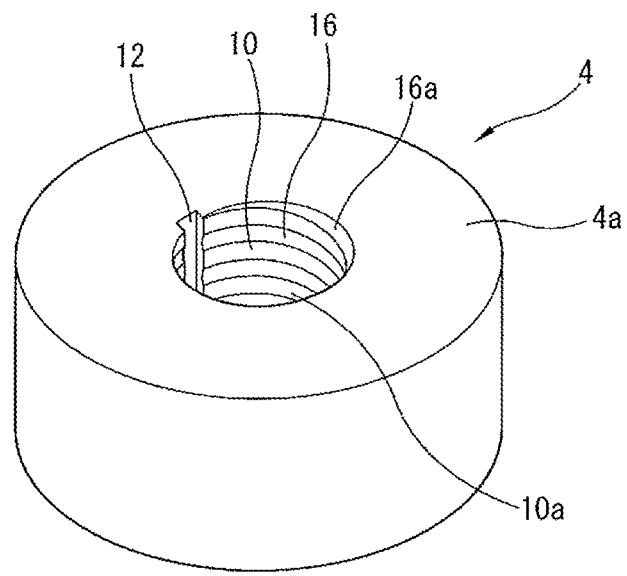
FIGS. 4A and 4B illustrate the rolling die according to the present embodiment.
Figure 4B:
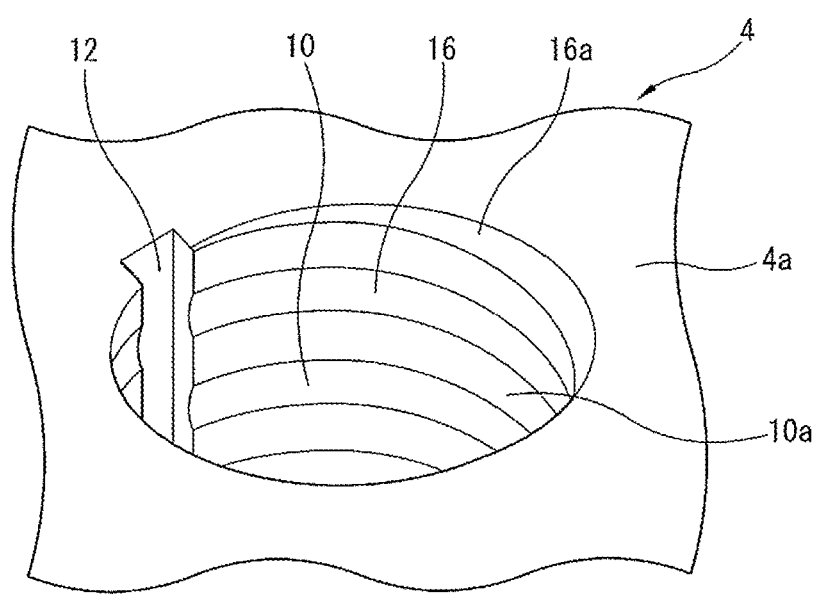

FIG. 1 is an overall block diagram of the round die rolling machine according to the embodiments of the present invention. FIG. 2 is a front view of a rolling die according to the present embodiment. FIG. 3 is a sectional view taken along an A-A line of FIG. 2. FIG. 4A is a perspective view of the rolling die. FIG. 4B is an enlarged view of a main part of FIG. 4A.

As a brief outline, the round die rolling machine is configured so as to have a bilaterally symmetrical shape as illustrated in FIG. 1. The round die rolling machine has a pair of headstocks 2, 2 placed on a base 1, a pair of main spindles 3, 3 arranged in directions facing the headstocks 2, 2 and driven and rotated by driving mechanisms (not shown), and a pair of rolling dies 4, 4 fixed to outer peripheries of the respective main spindles 3, 3.

The headstocks 2, 2 are configured to be able to move relative to each other in right and left lateral directions (in arrow directions) in the drawing, i.e. in directions approaching each other and moving away from each other, by a pair of electric motors and a pair of speed reducers (both not shown) of moving mechanisms 6, 6 supported by supporting frames 5, 5. The headstocks 2, 2 are supported and guided in the right and left lateral directions by four struts 7, 8, two of which are arranged at an upper side and the other two of which are arranged at a lower sides of the supporting frames 5, 5. Here, although the moving mechanisms 6, 6 are configured to be able to electrically move the headstocks 2, 2 relative to each other using the electric motors etc., the moving mechanisms 6, 6 could move the headstocks 2, 2 relative to each other by hydraulic cylinders or cam mechanisms.

The main spindles 3, 3 are configured to synchronously rotate in the same direction (in arrow X directions in the drawing) by drive units formed by electric motors and speed reducers (both not shown) provided inside the headstocks 2, 2. Further, the main spindles 3, 3 are configured to be able to tilt (incline) in a vertical direction by tilting mechanisms 9, 9 provided at the headstocks 2, 2. The tilting mechanisms 9, 9 are driven and controlled by so-called CNC control.

As illustrated in FIGS. 2 to 4A and 4B, the rolling dies 4, 4 are each formed into a cylindrical tubular shape from metal material such as alloy tool steel or high speed tool steel which are suitable for rolling. At each of the rolling dies 4, 4, a penetration hole 10 into which the main spindle 3 is inserted in a direction of an inner central axis is formed so as to penetrate the rolling die 4, and threading teeth 11 for threading process are formed on an outer peripheral surface of the rolling die 4.

Relative rotation of each of the rolling dies 4, 4 with respect to the main spindles 3, 3 is limited (restricted) by key grooves 12, 12 as restricting portions (marking portions) formed linearly in the axial direction on inner peripheral surfaces 10a, 10a of the penetration holes 10, 10 and keys 13, 13 as restricting portions inserted into the key grooves 12, 12. Each rolling die 4 is structured to rotate in the same counterclockwise direction as the main spindle 3 as indicated by the arrow in FIG. 1 with a rotation force transmitted from the main spindle 3. The key grooves 12, 12 of the rolling dies 4, 4 and the keys 13, 13 are formed at the same positions (reference positions) in circumferential directions of the penetration holes 10, 10.

A steering shaft 14, which is the object to be rolled described above, is disposed in a sandwiching or holding state between the both rolling dies 4, 4. An outer peripheral surface of this steering shaft 14 is plastically deformed by the threading teeth 11, 11, then a male screw groove is formed. The steering shaft 14 is rotatably mounted at an upper end portion of a supporting member 15 provided on an upper surface of the base 1. The supporting member 15 is formed into a plate shape. The supporting member 15 is positioned below the rolling dies 4, 4 between the both rolling dies 4, 4, and a lower end portion of the supporting member 15 is fixed to the base 1.

As illustrated in FIGS. 2 to 4A and 4B, oil grooves 16, 16 are formed on the inner peripheral surfaces 10a, 10a of the penetration holes 10, 10 of the rolling dies 4, 4.

In the following description, as an example, the oil groove 16 of one rolling die 4 will be described. This oil groove 16 is spirally formed on the entire inner peripheral surface 10a of the penetration hole 10. One end portion 16a, in the axial direction, of the oil groove 16 is open to one side surface 4a of the rolling die 4, and the other end portion 16b is open to the other side surface 4b of the rolling die 4. The oil groove 16 has a spiral width W set to a predetermined distance, and the one end portion 16a that is open to the one side surface 4a is formed into a semicircular arc shape that is long in a circumferential direction as shown in FIGS. 4A and 4B. Similarly, the other end portion 16b that is open to the other side surface 4b is also formed into a semicircular arc shape that is long in the circumferential direction.

The other rolling die 4 also has the spiral oil groove 16 formed on the inner peripheral surface 10a of the penetration hole 10. In terms of this oil groove 16 of the other rolling die 4, although the spiral width W is the same as that of the oil groove 16 of the above one rolling die 4, a turn forming position (a circumferential position) with respect to the inner peripheral surface 10a is different. Therefore, forming positions in the circumferential direction of the semicircular arc-shaped one end portion 16a and other end portion 16b of the oil groove 16 of the other rolling die 4 are different from those of the oil groove 16 of the one rolling die 4.

Further, the oil grooves 16 of the respective rolling dies 4 are formed at different positions in the circumferential direction with the key groove 12 and the key 13 being a reference.

When the rolling dies 4, 4 are fitted onto (inserted to) and fixed to the respective main spindles 3, 3 through the penetration holes 10, 10, oil is injected into the oil grooves 16, 16 from either one of the one end portion 16a and the other end portion 16b, for instance, by hand.

Figure 5A:
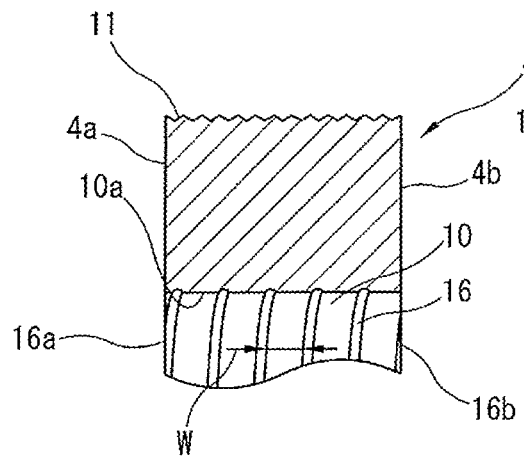
FIGS. 5A to 5D illustrate two rolling dies which are different in a forming position of an oil groove according to the present embodiment.
Figure 5C:
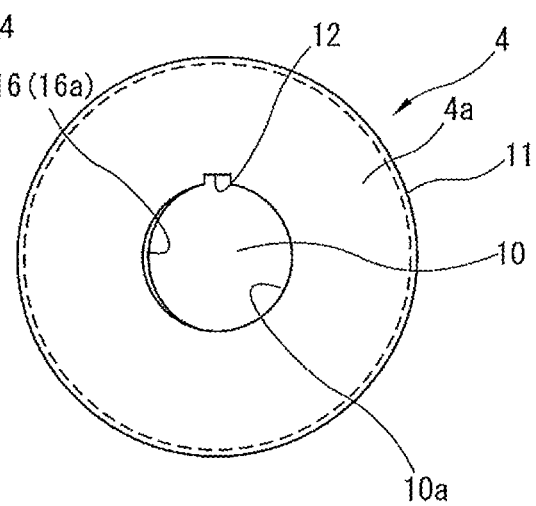
Figure 5B:
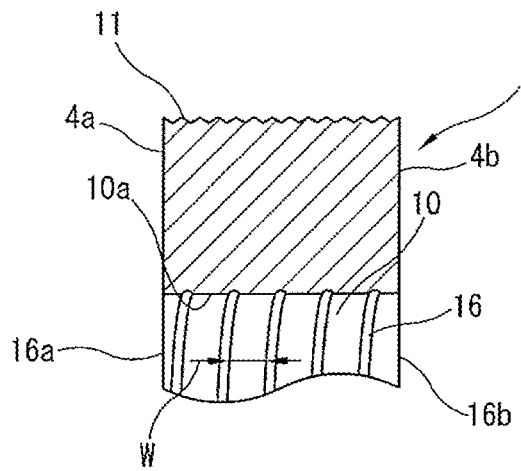
Figure 5D:
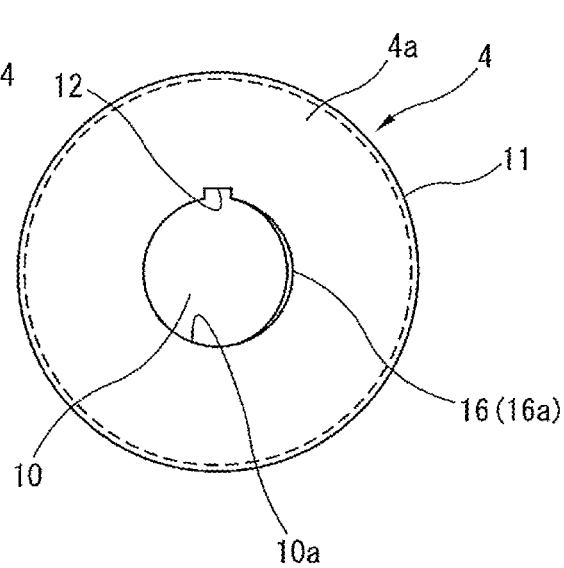

FIGS. 5A and 5B are local sectional views of the rolling dies which are different in the forming position of the plurality of oil grooves 16. FIGS. 5C and 5D are front views of the rolling dies corresponding to FIGS. 5A and 5B.

Each rolling die 4 is replaced with another one when the threading teeth 11 wear out due to long-time rolling work, and a plurality of new rolling dies 4 to be replaced are prepared in advance. In terms of the plurality of these rolling dies 4 prepared for the replacement, as illustrated in FIGS. 5A and 5B, the turn forming positions of the spiral oil grooves 16 formed on the inner peripheral surfaces 10a of the respective penetration holes 10 are slightly shifted in the axial direction.

With this, for instance, as shown in FIG. 5C, an opening position of the one end portion 16a of the oil groove 16 of one rolling die 4 is located at an upper end of the penetration hole 10. In contrast to this, with regard to the oil groove 16 of the other rolling die 4, as shown in FIG. 5D, the opening position of the one end portion 16a (including the other end portion 16b) is located at a side portion that is at about 45 degree from the upper end of the penetration hole 10 to the right in the circumferential direction. The oil grooves 16 of the plurality of other rolling dies 4 are also different from each other, i.e. the forming positions of the oil grooves 16 are shifted in the axial direction, or, a length of the spiral width W is different from each other, and so on.

A method of rolling the male screw groove on the outer peripheral surface of the steering shaft 14 by the round die rolling machine of the present embodiment is performed by a general method based on the CNC control. Therefore, its detailed description is omitted.

As described above, in the round die rolling machine of the present embodiment, for instance, when each rolling die 4 is fitted onto (inserted to) the main spindle 3 through the penetration hole 10, oil is injected into the spiral oil groove 16 and the spiral oil groove 16 is filled with the oil in advance. With this, a substantially uniform oil film is formed between an outer peripheral surface of the main spindle 3 and the inner peripheral surface 10a of the penetration hole 10 of the rolling die 4 during drive of the rolling machine. Therefore, there is no occurrence of adhesion (sticking) of the rolling die 4 to the outer peripheral surface of the main spindle 3, for instance, due to high processing heat generated during drive of the rolling machine. This then facilitates removal of the rolling die 4 from the main spindle 3, and can improve replacement efficiency.

That is, in the conventional rolling machine described in Patent Document 1, high processing heat is generated during long-time rotary processing of each rolling die, and this high heat is transferred from each rolling die to each main spindle, then there is a risk that the inner peripheral surface of the penetration hole of each rolling die will adhere to (stick to) the outer peripheral surface of each main spindle by this high heat.

Further, if the rolling die is forcibly removed, for instance, by hitting the rolling die hard with hammer, there is concern that rolling accuracy will be decreased due to an occurrence of distortion at the main spindle and/or equipment etc.

However, in the present embodiment, since the oil film is formed between the outer peripheral surface of the main spindle 3 and the inner peripheral surface 10a of the penetration hole 10 of the rolling die 4 by the oil injected into the oil groove 16, the occurrence of the adhesion (the sticking) between the main spindle 3 and the rolling die 4 due to the high processing heat can be adequately suppressed. As a result, efficiency in the replacement work when replacing the rolling die 4 is improved. In addition, since there is no need to forcibly remove the rolling die 4 by hitting the rolling die with hammer etc., distortion does not occur at the main spindle 3 and/or equipment etc., then decrease in rolling accuracy can be suppressed.

Here, in the conventional rolling machine described in Patent Document 1, as shown in FIG. 2(b) of Patent Document 1, an annular groove is provided at an inner middle position of the penetration hole of the rolling die, and this annular groove is formed so that its width length in the axial direction is relatively great. Because of this, a contact area between the inner peripheral surface of the penetration hole and the outer peripheral surface of the main spindle during drive of the rolling machine is reduced, then a withstand load on the main spindle is increased. As a consequence, the outer peripheral surface of the main spindle may be easily worn out, and there is a risk that durability will be decreased.

In contrast to this, in the present embodiment, since the oil groove 16 is formed into the spiral or linear shape with a small width, a contact area between the inner peripheral surface 10a of the penetration hole 10 and the outer peripheral surface of the main spindle 3 can be sufficiently secured. It is therefore possible to suppress an occurrence of the wear of the main spindle 3 that receives the withstand load.

Further, in the present embodiment, the turn forming position of the oil groove 16 in the axial direction is changed for each of the plurality of rolling dies 4. Therefore, when replacing the rolling die 4, the rolling die 4 can be replaced with other rolling die 4 having the oil groove 16 whose forming position is different. Therefore, an occurrence of local wear of the outer peripheral surface of the main spindle 3 can be suppressed by sliding with the inner peripheral surface 10a of the penetration hole 10 of the replaced rolling die 4, thereby improving the durability.

Moreover, since oil can be injected into the oil groove 16 from the opening of the one end portion 16a or the opening of the other end portion 16b by hand when the drive of the rolling machine is stopped, cost can be reduced. That is, since the injection is performed by hand using an injector, as compared with a case where oil is automatically injected using equipment or device, cost can be reduced.

The one end portion 16a and the other end portion 16b of the oil groove 16 are formed into the semicircular arc shape, and their overall opening area are sufficiently larger than a linear cross-sectional area. Therefore, oil injection work into the oil groove 16 from the one end portion 16a or the other end portion 16b using the injector is facilitated. Also, a large amount of oil can be injected by one injection.

The oil groove 16 is spirally formed on the inner peripheral surface 10a of the penetration hole 10. Therefore, the oil film can easily be formed on the entire inner peripheral surface 10a of the penetration hole 10 and the entire outer peripheral surface of the main spindle 3. Further, a molding process using a milling tool and the like is facilitated. Furthermore, since an entire length in the axial direction can be long, oil retention can be improved.

Moreover, when replacing the rolling die 4 after long-time use with other one, it is possible to select other rolling die 4 having the oil groove 16 whose forming position is different with the key groove 12 and/or the key 13 formed at the same position in the circumferential direction being a reference, and to replace the rolling die 4 used with this selected rolling die 4.

Second Embodiment

Figure 6A:
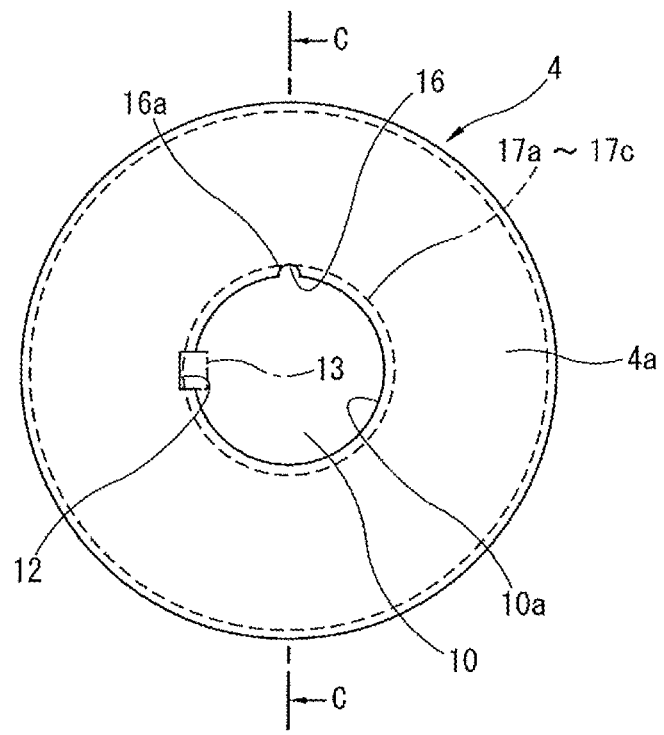
FIGS. 6A and 6B illustrate a rolling die provided in the rolling machine according to a second embodiment of the present invention.
Figure 6B:
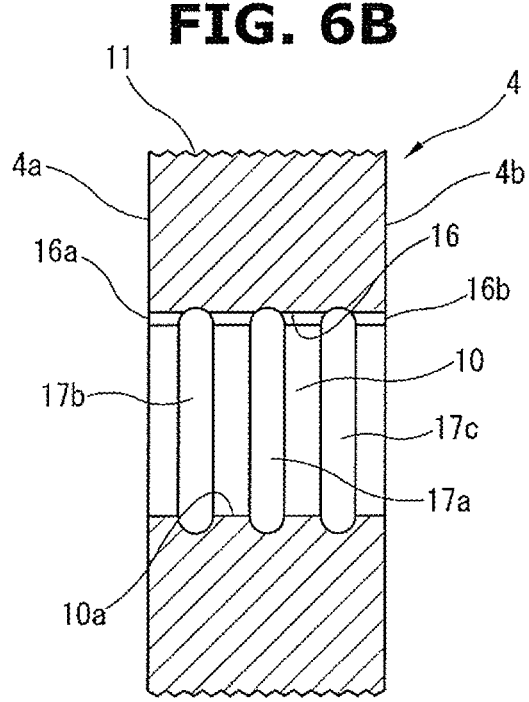

FIGS. 6A and 6B illustrate a rolling die provided in the rolling machine according to a second embodiment of the present invention. FIG. 6A is a front view of the rolling die. FIG. 6B is a sectional view taken along a C-C line of FIG. 6A.

As shown in FIGS. 6A and 6B, this rolling die 4 is formed so that the oil groove 16 is formed linearly from one end to the other end in the axial direction on the inner peripheral surface 10a of the penetration hole 10. That is, this oil groove 16 has a substantially semicircular cross-sectional shape orthogonal to the axis of the penetration hole 10, and is formed into an elongated linear shape along the axial direction of the penetration hole 10 from the one end portion 16a to the other end portion 16b, each of which is open to the both side surfaces of the rolling die 4.

Further, three of first to third annular grooves 17a, 17b and 17c communicating with the oil groove 16 are provided at three positions in the axial direction on the inner peripheral surface 10a of the penetration hole 10. These annular grooves are the first annular groove 17a provided at a substantially middle position in the axial direction of the penetration hole 10 and the second and third annular grooves 17b and 17c arranged at both side portions of the first annular groove 17a with a constant span. The first to third annular grooves 17a, 17b and 17c communicate with each other in such a manner that the oil groove 16 traverses respective upper end portions, shown in FIG. 6A, of the first to third annular grooves 17a, 17b and 17c. Therefore, oil injected into the oil groove 16 from the one end portion 16a or the other end portion 16b fills each of insides of the annular grooves 17a, 17b and 17c.

According to the second embodiment, since the three annular grooves 17a to 17c are formed in addition to the linear oil groove 16, each of the annular grooves 17a to 17c functions as an oil reservation portion reserving oil injected into the oil groove 16. Therefore, an oil film forming action between the inner peripheral surface 10a of the penetration hole 10 and the outer peripheral surface of the main spindle 3 is improved, thereby further improving an effect of suppressing the adhesion (the sticking) of the rolling die 4 to the main spindle 3 after long-time drive of the rolling machine.

Third embodiment

Figure 7A:
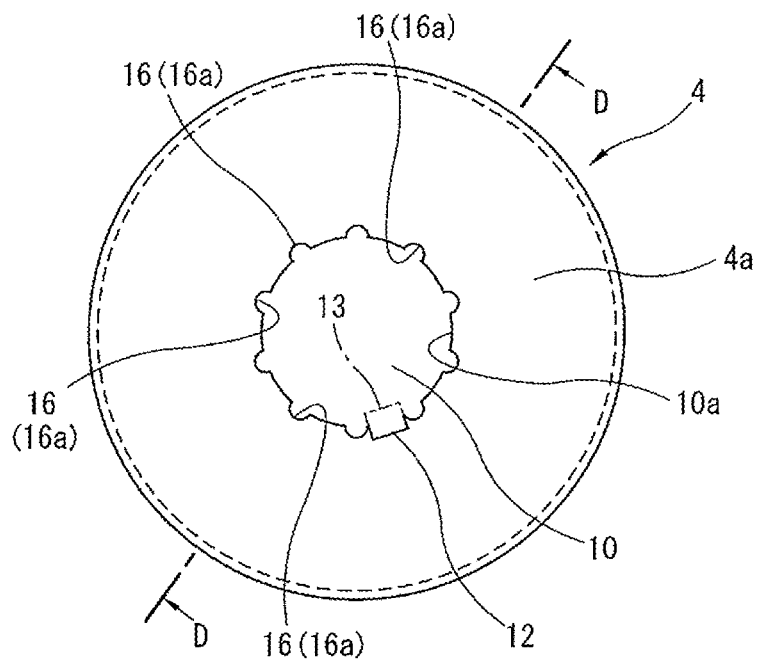
FIGS. 7A and 7B illustrate a rolling die provided in the rolling machine according to a third embodiment of the present invention.
Figure 7B:
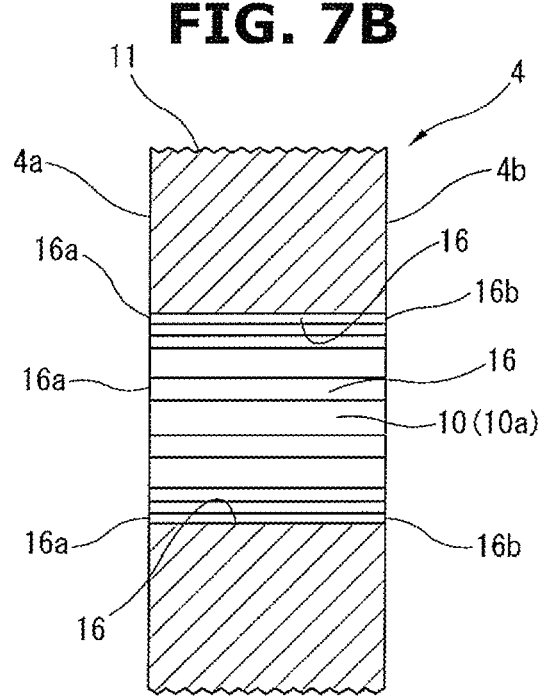

FIGS. 7A and 7B illustrate a rolling die provided in the rolling machine according to a third embodiment of the present invention. FIG. 7A is a front view of the rolling die. FIG. 7B is a sectional view taken along a D-D line of FIG. 7A.

As shown in FIGS. 7A and 7B, this rolling die 4 is formed so that a plurality of oil grooves 16 (ten oil grooves 16 in the present embodiment) are formed on the inner peripheral surface 10a of the penetration hole 10 along the axial direction. These ten oil grooves 16 are arranged at regular intervals of about 36° in the circumferential direction, and each have a substantially semicircular cross-sectional shape orthogonal to the axis of the penetration hole 10. Further, each of the oil grooves 16 is formed into an elongated linear shape along the axial direction of the penetration hole 10 from the one end portion 16a to the other end portion 16b, each of which is open to the both side surfaces of the rolling die 4.

According to the third embodiment, the ten oil grooves 16 are provided along the axial direction of the penetration hole 10, oil retention is improved, and the oil film is sufficiently formed between the main spindle 3 and the rolling die 4.

It is noted that although the number of the oil grooves 16 is ten, it could be ten or less or more. cl Fourth embodiment As a fourth embodiment of the present invention, although it does not specifically illustrated in the drawings, the oil groove 16 is formed into an oblique shape at a predetermined angle to the axial direction with respect to a rotation axis of the rolling die 4 on the inner peripheral surface 10a of the penetration hole 10. That is, unlike the spiral or linear oil groove 16 as in the above embodiments, the oil groove 16 is inclined at the predetermined angle from the one end portion 16a to the other end portion 16b.

In this embodiment, the oil groove 16 is formed into turning-oblique shape at the predetermined angle along the axial direction with respect to the penetration hole 10 with less than one round. By forming the oil groove 16 into the oblique shape in this manner, as compared with a case where opening areas of the one end portion 16a and the other end portion 16b are formed into a linear shape, opening areas of those of the oil groove 16 of the present embodiment can be large, thereby facilitating the injection of oil into the oil groove 16.

The present invention is not limited to the configurations of the above embodiments, but can be applied to rolling machines other than the round die rolling machine.

Further, the object to be rolled is not limited to the ball screw, but includes a general shaft-shaped member having a male screw formed at its outer periphery.

In addition, at least one of the one end portion 16a and other end portion 16b of the oil groove 16 could be formed to be open to the outside.

Moreover, the oil groove 16 could be formed only on the outer peripheral surface of the main spindle 3 which corresponds to the inner peripheral surface 10a of the penetration hole 10.

As the rolling machine and the manufacturing method of the ball screw using the rolling machine based on the embodiments described above, for instance, the following aspects can be raised.

As one aspect of the present invention, a rolling machine comprises: a rolling die structured to form a male screw by pressing a shaft-shaped member and plastically deforming an outer peripheral surface of the shaft-shaped member while rotating in contact with the outer peripheral surface of the shaft-shaped member; a main spindle inserted into a penetration hole of the rolling die, which is formed so as to penetrate the rolling die in a direction of a rotation axis of the rolling die, and transmitting a rotation force to the rolling die; a restricting portion restricting a relative rotation of the rolling die with respect to the main spindle; and a linear oil groove provided on an inner peripheral surface of the penetration hole or an outer peripheral surface of the main spindle and extending from an end portion side in an axial direction of the penetration hole in an inner axial direction of the penetration hole.

According to this aspect of the present invention, since the oil film is formed between the outer peripheral surface of the main spindle and the inner peripheral surface of the penetration hole of the rolling die by oil supplied inside the oil groove, there is no occurrence of adhesion (sticking) of the rolling die to the main spindle, for instance, due to high processing heat generated during drive of the rolling machine. This then facilitates removal of the rolling die from the main spindle, and can improve replacement efficiency.

As a preferable aspect of the present invention, the oil groove is formed on the inner peripheral surface of the penetration hole of the rolling die.

According to this aspect of the present invention, by forming the oil groove on the inner peripheral surface of the penetration hole of the rolling die, forming position of the oil groove can be changed for each of a plurality of rolling dies. That is, by making the forming positions of the oil grooves differ from each other, when replacing the rolling die, it is possible to replace the rolling die with a rolling die having the oil groove whose forming position is different. With this, an occurrence of local wear of the outer peripheral surface of the main spindle can be suppressed by sliding with the inner peripheral surface of the penetration hole of the replaced rolling die, thereby improving the durability.

As a preferable aspect of the present invention, one end portion, in the axial direction of the penetration hole, of the oil groove is open to the outside, and the other end portion, in the axial direction of the penetration hole, of the oil groove is also open to the outside.

According to this aspect of the present invention, since oil can be injected into the oil groove from the opening of the one end portion or the opening of the other end portion when the drive of the rolling machine is stopped, oil injection work is facilitated.

As a preferable aspect of the present invention, the oil groove is formed into an oblique shape to the axial direction with respect to the rotation axis of the rolling die on the inner peripheral surface of the penetration hole.

According to this aspect of the present invention, the oil groove can be formed into turning-oblique shape at the predetermined angle along the axial direction with respect to the penetration hole with less than one round. By forming the oil groove 16 into the oblique shape in this manner, as a matter of course, the oil film can be uniformly formed on the entire inner peripheral surface of the penetration hole and the entire outer peripheral surface of the main spindle, and also, as compared with a case where opening areas of the one end opening and the other end opening are formed into a linear shape, opening areas of those of the oil groove can be large, thereby facilitating the injection of oil into the oil groove.

As a preferable aspect of the present invention, the oil groove is spirally formed on the inner peripheral surface of the penetration hole.

According to this aspect of the present invention, since the oil groove is spirally formed, the oil film can be uniformly formed on the entire inner peripheral surface of the penetration hole and the entire outer peripheral surface of the main spindle, and also, this oil groove can relatively easily be formed. Further, since opening areas of the one end portion opening and the other end portion opening can be large, the oil injection is facilitated. In addition, by spirally forming the oil groove, an entire length of the oil groove can be long, then oil retention can be improved.

As a preferable aspect of the present invention, openings of the one end portion and the other end portion of the oil groove extend in respective circumferential directions.

According to this aspect of the present invention, since the openings of the one end portion and the other end portion of the oil groove extend in respective circumferential directions, respective opening areas are large. Therefore, the injection of oil into the oil groove is facilitated from each opening, thereby improving workability of the oil injection.

As a preferable aspect of the present invention, the oil groove is formed linearly in the axial direction on the inner peripheral surface of the penetration hole, and one or two or more annular grooves communicating with the oil groove is formed in a circumferential direction on the inner peripheral surface of the penetration hole.

According to this aspect of the present invention, since the annular groove (s) is formed on the inner peripheral surface of the penetration hole in addition to the linear oil groove, each annular groove functions as an oil reservation portion reserving oil supplied from the oil groove. Therefore, an oil film forming action between the inner peripheral surface of the penetration hole and the outer peripheral surface of the main spindle is improved, thereby further improving an effect of suppressing the adhesion (the sticking) of the rolling die to the main spindle.

As a preferable aspect of the present invention, a plurality of oil groove are provided along the axial direction on the inner peripheral surface of the penetration hole.

According to this aspect of the present invention, by forming the plurality of oil groove, a sufficient contact area between the outer peripheral surface of the main spindle and the inner peripheral surface of the penetration hole and can be secured, and a sufficient amount of oil can be retained.

As a preferable aspect of the present invention, the oil groove is formed on the outer peripheral surface, which corresponds to the penetration hole, of the main spindle.

As another preferable aspect of the present invention, a method for manufacturing a ball screw using the rolling machine as claimed in claim 1, wherein the ball screw has a nut which has a female thread formed on an inner peripheral surface of the nut, the metal shaft-shaped member to which the nut is assembled and which has the male screw formed on the outer peripheral surface of the shaft-shaped member and facing the female thread, and a plurality of balls disposed between the female thread and the male screw, the method comprises: forming the male screw by bringing the rolling die, which is rotating by the rotation force transmitted from the main spindle, into contact with the outer peripheral surface of the shaft-shaped member, pressing the shaft-shaped member and plastically deforming the outer peripheral surface of the shaft-shaped member.

As a preferable aspect of the present invention, the method further comprises: when replacing the rolling die which is a pre-replacement rolling die, using a rolling die which is a post-replacement rolling die having the oil groove whose forming position in a circumferential direction is different from that of the pre-replacement rolling die.

According to this aspect of the present invention, when replacing the rolling die, since the rolling die having the oil groove whose forming position is different is used, as compared with a rolling die having the oil groove whose forming position is the same, an occurrence of local wear of the outer peripheral surface of the main spindle can be suppressed.

As a preferable aspect of the present invention, a plurality of rolling dies for the replacement each have a marking portion formed at a same position in the circumferential direction, and the oil grooves of the plurality of rolling dies are different from each other in a forming position of the oil groove with respect to the marking portion in the circumferential direction.

According to this aspect of the present invention, when replacing the rolling die, it is possible to select a rolling die having the oil groove whose forming position is different with the marking portion formed at the same position in the circumferential direction being a reference, and to replace the rolling die used with this selected rolling die.

As a preferable aspect of the present invention, the marking portion is a key groove formed from a hole edge of the penetration hole in the inner axial direction of the penetration hole, and by inserting a key into the key groove from the axial direction and fixing the key to the key groove, the relative rotation of the rolling die with respect to the main spindle is restricted.

As a preferable aspect of the present invention, the ball screw is used in an electric power steering device that gives a steering force by moving the shaft-shaped member in the axial direction by transmitting a rotation force of an electric motor to the nut.

EXPLANATION OF REFERENCE 1 base, 2 headstock, 3 main spindle, 4 rolling die, 4a one side surface, 4b the other side surface, 5 supporting frame, 6 electric motor, 7, 8 strut, 9 tilting mechanism, 10 penetration hole, 10a inner peripheral surface, 12 key groove (restricting portion), 13 key (restricting portion), 14 steering shaft (shaft-shaped member), 16 oil groove, 16a one end portion, 16b the other end portion, 17a, 17b, 17c annular grooves

The invention claimed is:

1. A method for manufacturing a ball screw using a rolling machine, the rolling machine including:
- a rolling die structured to form a male screw by pressing a shaft-shaped member and plastically deforming an outer peripheral surface of the shaft-shaped member while rotating in contact with the outer peripheral surface of the shaft-shaped member;
- a main spindle inserted into a penetration hole of the rolling die, which is formed so as to penetrate the rolling die in a direction of a rotation axis of the rolling die, and transmitting a rotation force to the rolling die;
- a restricting portion restricting a relative rotation of the rolling die with respect to the main spindle; and
- a linear oil groove provided on an inner peripheral surface of the penetration hole or an outer peripheral surface of the main spindle and extending from an end portion side in an axial direction of the penetration hole in an inner axial direction of the penetration hole,
- wherein the ball screw has a nut which has a female thread formed on an inner peripheral surface of the nut, the metal shaft-shaped member to which the nut is assembled and which has the male screw formed on the outer peripheral surface of the shaft-shaped member and facing the female thread, and a plurality of balls disposed between the female thread and the male screw, the method comprising:
- forming the male screw by bringing the rolling die, which is rotating by the rotation force transmitted from the main spindle, into contact with the outer peripheral surface of the shaft-shaped member, pressing the shaft-shaped member and plastically deforming the outer peripheral surface of the shaft-shaped member; and
- when replacing the rolling die which is a pre-replacement rolling die, using a rolling die which is a post-replacement rolling die having the oil groove whose forming position in a circumferential direction is different from that of the pre-replacement rolling die.

2. The method for manufacturing the ball screw using the rolling machine as claimed in claim 1, wherein
- a plurality of rolling dies for the replacement each have a marking portion formed at a same position in the circumferential direction, and
- the oil grooves of the plurality of rolling dies are different from each other in a forming position of the oil groove with respect to the marking portion in the circumferential direction.

3. The method for manufacturing the ball screw using the rolling machine as claimed in claim 2, wherein
- the marking portion is a key groove formed from a hole edge of the penetration hole in the inner axial direction of the penetration hole, and
- by inserting a key into the key groove from the axial direction and fixing the key to the key groove, the relative rotation of the rolling die with respect to the main spindle is restricted.

4. The method for manufacturing the ball screw using the rolling machine as claimed in claim 1, wherein
- the ball screw is used in an electric power steering device that gives a steering force by moving the shaft-shaped member in the axial direction by transmitting a rotation force of an electric motor to the nut.

* * * * *